UNITED STATES PATENT OFFICE.

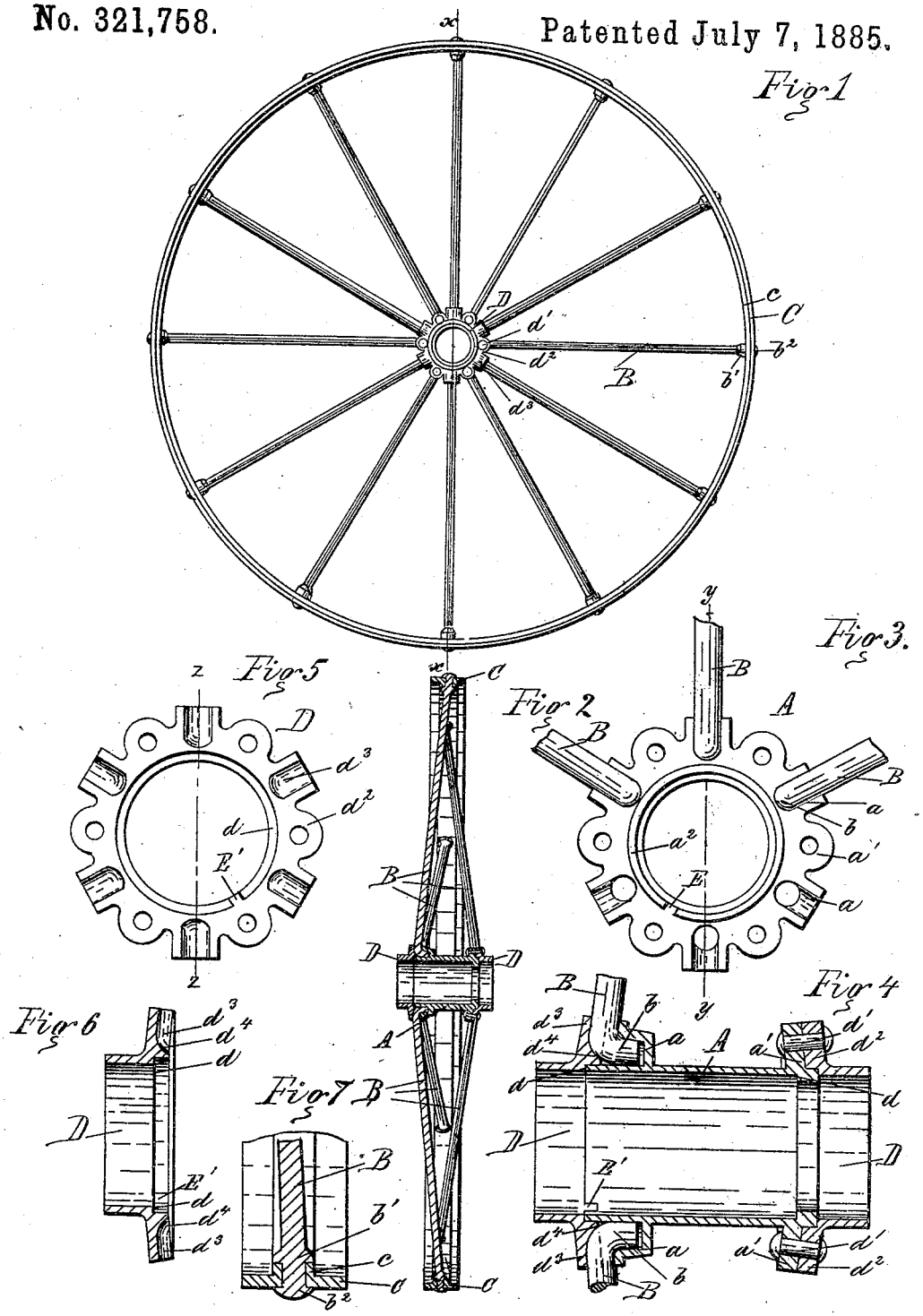

MARSHALL SATTLEY, OF TAYLORVILLE, ILLINOIS, ASSIGNOR OF ONE-THIRD TO ARCHIBALD SATTLEY, OF SAME PLACE.

VEHICLE-WHEEL.

SPECIFICATION forming part of Letters Patent No. 321,758, dated July 7, 1885.

Application filed September 10, 1884. (No model.)

*To all whom it may concern:*

Be it known that I, MARSHALL SATTLEY, a citizen of the United States, residing at Taylorville, in the county of Christian and State of Illinois, have invented certain new and useful Improvements in Vehicle-Wheels, which are fully set forth in the following specification, reference being had to the accompanying drawings, in which—

Figure 1 is an elevation of a wheel embodying my invention; Fig. 2, a sectional view of the same on the line $x\,x$, Fig. 1. Fig. 3 is a view of the hub with the cap and some of the spokes removed; Fig. 4, a sectional view of the same on the line $y\,y$, Fig. 3; Fig. 5, a face view of the cap detached; Fig. 6, a sectional view of the same on the line $z\,z$, Fig. 5; and Fig. 7 a detail view.

Like letters refer to like parts in all the figures.

My invention relates to vehicle-wheels, and more especially to those designed for use in agricultural implements; and it consists in certain novel features, which I will now proceed to describe, and then specifically point out in the claim.

In the drawings, A represents the hub of my wheel, which may be made of cast-iron; but it is preferably constructed of cast-iron subsequently made malleable by any of the well-known processes used to effect that result. It is cast all in one piece, and has on its outer surface, near each end, a series of sockets, $a$, to receive the inwardly-bent ends $b$ of the spokes B. The outer ends of the spokes are formed with collars $b'$ near their extremities, said extremities passing through the holes in the tire C, being bent down after insertion, as shown at $b^2$ in Fig. 7, the collars $b'$ bearing against the inner surface of the tire C, or against a rib or projection, $c$, thereon. The ends $b$ of the spokes are retained in position in the sockets $a$ by means of caps D, secured on each end of the hub, the caps being preferably cut away, as shown at $d$, to receive the projecting portion $a^2$ of the hub. These caps are secured by means of rivets or bolts $d'$, passing through rods $d^2$ on the caps and through similar lugs, $a'$, on the hub, the lugs on the hub being arranged between the sockets $a$. These caps are also provided with half seats or sockets $d^3$, which receive the lower end of the spokes, as clearly shown in Fig. 4, the bottom of these seats being rounded off, as shown at $b^4$, to form a seat for the rounded portion of the spokes D, caused by the bend therein.

In order to cause the hub and cap to register properly and without difficulty, I have formed in the projecting portions $a^2$ of the former a notch, E, into which fits a projection, E', on the cut-away portion $d$ of the disks.

In the construction of my wheels, the outer ends of the spokes are first slipped through the holes in the tire C, and their inner ends are then inserted in the sockets $a$. The caps are then applied and secured by rivets or bolts, and the outer ends of the spokes are headed down and riveted. The construction is such that the parts are readily assembled and with but little labor, and are few in number and simple in construction, while at the same time they produce a wheel having great strength and durability.

The spokes are preferably constructed of wrought-iron, though they may be made of cast-iron malleableized, or of steel or other suitable metal.

It is obvious that many mechanical changes in the details of construction shown and described may be made without departing from the spirit of my invention, and I therefore do not desire to be understood as limiting myself strictly to the precise details of construction shown and described.

Having thus described my invention, what claim as new, and desire to secure by Letters Patent, is—

The herein-described vehicle-wheel, consisting of the cylindrical hub A, having formed on its exterior, near each end, the independent sockets $a$ and the perforated lugs $a'$, arranged between the said sockets, the rim C, the spokes B, secured thereto and having their inner ends bent inward to enter the sockets $a$, the caps D, cut away at $d$ to fit over the ends of the hub A, and provided at their edges with the half-seats $d^3$ to rest against the spokes, and the perforated lugs $d^2$, arranged opposite the lugs $a'$, and suitable bolts or rivets, $d'$, passing through the lugs $a'$ and $d^2$ to secure the caps in place, substantially as and for the purposes specified.

MARSHALL SATTLEY.

Witnesses:
W. A. WHITECRAFT,
W. M. PROVINE.